United States Patent
Guinart et al.

(10) Patent No.: US 10,639,947 B2
(45) Date of Patent: May 5, 2020

(54) METHOD FOR CONFIGURING AN ELECTRONIC HOUSING MOUNTED ON A WHEEL OF AN AUTOMOTIVE VEHICLE

(71) Applicants: Continental Automotive France, Toulouse (FR); Continental Automotive GmbH, Hannover (DE)

(72) Inventors: Nicolas Guinart, Toulouse (FR); Jean-Philippe Boisset, Montauban (FR); Olivier Fudulea, Toulouse (FR); Jean-Charles Huard, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 169 days.

(21) Appl. No.: 16/063,525

(22) PCT Filed: Dec. 12, 2016

(86) PCT No.: PCT/EP2016/002096
§ 371 (c)(1),
(2) Date: Jun. 18, 2018

(87) PCT Pub. No.: WO2017/108166
PCT Pub. Date: Jun. 29, 2017

(65) Prior Publication Data
US 2018/0370300 A1    Dec. 27, 2018

(30) Foreign Application Priority Data
Dec. 22, 2015   (FR) ...................... 15 63123

(51) Int. Cl.
*B60C 23/04*   (2006.01)
*B60C 23/06*   (2006.01)
*G01P 3/44*    (2006.01)

(52) U.S. Cl.
CPC .......... *B60C 23/0489* (2013.01); *B60C 23/04* (2013.01); *B60C 23/0455* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

2005/0204806 A1   9/2005   Brusarosco et al.
2008/0126006 A1   5/2008   Bertrand
(Continued)

FOREIGN PATENT DOCUMENTS

CN   1649764 A      8/2005
CN   101080332 A    11/2007
(Continued)

OTHER PUBLICATIONS

International Search Report and Written Opinion for International Application No. PCT/EP2016/002096, dated Feb. 16, 2017—7 pages.
(Continued)

*Primary Examiner* — Andre J Allen
(74) *Attorney, Agent, or Firm* — RatnerPrestia

(57) ABSTRACT

A method for configuring an electronic housing mounted on a wheel of a motor vehicle for the purposes of transmitting signals intended for a central unit incorporated into the motor vehicle, involving dividing one turn of the wheel into a predetermined number n of referenced sectors, commanding the emission of a sequence of n successive signals, referred to as configuration signals, which are synchronized with the n referenced sectors and of emission duration $t_{em} \leq T/n$, where T is the period of rotation of the wheel, identifying and memorizing the referenced sectors corre-
(Continued)

sponding to the configuration signals received by the central unit, and configuring the electronic housing by selecting at least one of the identified referenced sectors for the subsequent emission of the signals intended for the central unit.

13 Claims, 2 Drawing Sheets

(52) U.S. Cl.
CPC .......... *B60C 23/0488* (2013.01); *B60C 23/06* (2013.01); *G01P 3/44* (2013.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28

See application file for complete search history.

(56) References Cited

U.S. PATENT DOCUMENTS

| | | | |
|---|---|---|---|
| 2010/0274441 A1 | 10/2010 | Carresjo | |
| 2011/0013823 A1* | 1/2011 | Joly | G01M 17/027 382/141 |
| 2014/0379291 A1* | 12/2014 | Mori | B60C 23/0488 702/138 |
| 2015/0142259 A1* | 5/2015 | Mori | B60C 23/0416 701/32.7 |
| 2015/0183279 A1* | 7/2015 | Okada | B60C 23/0488 235/375 |
| 2015/0191056 A1* | 7/2015 | Mori | B06C 23/0416 73/146.5 |
| 2016/0318355 A1* | 11/2016 | Guinart | B60C 23/0416 |
| 2017/0001485 A1 | 1/2017 | Kessler et al. | |
| 2019/0329605 A1* | 10/2019 | Fischer | B60C 23/0437 |

FOREIGN PATENT DOCUMENTS

| | | | | |
|---|---|---|---|---|
| CN | 101883690 A | 11/2010 | | |
| DE | 102016225481 A1 * | 6/2018 | ......... | B60C 23/0438 |
| JP | 2011105083 A | 6/2011 | | |
| WO | 2015090554 A1 | 6/2015 | | |
| WO | 2015135660 A1 | 9/2015 | | |

OTHER PUBLICATIONS

Chinese Office Action for Chinese Application No. 201680075665.6, dated Nov. 20, 2019 with translation, 12 pages.

* cited by examiner

METHOD FOR CONFIGURING AN ELECTRONIC HOUSING MOUNTED ON A WHEEL OF AN AUTOMOTIVE VEHICLE

CROSS REFERENCE TO RELATED APPLICATIONS

This application is the U.S. National Phase application of PCT International Application No. PCT/EP2016/002096, filed Dec. 12, 2016, which claims priority to French Patent Application No. 1563123, filed Dec. 22, 2015, the contents of such applications being incorporated by reference herein.

FIELD OF THE INVENTION

The invention relates to a method for configuring an electronic housing mounted on a wheel of a motor vehicle for the purposes of transmitting signals intended for a central unit incorporated into said motor vehicle.

BACKGROUND OF THE INVENTION

One of the problems encountered when transmitting data between the electronic housings mounted on the wheels of motor vehicles and the central unit incorporated into these motor vehicles is the result of there being zones without radiofrequency coverage, commonly referred to as "shadow zones" or "blackspots", which consist of relative positionings between the electronic housings and the central unit for which communications between these are cut-off or, at the very least, impaired.

Because the position of these blackspots is very difficult to predict and to define, the current solutions employed with a view to alleviating the disadvantages associated with their presence generally consist in multiplying the number of messages emitted.

Thus, for example, in the context of methods aimed at locating the wheels by synchronization and angular correlation, the concept of which is based on correlating the angular information there is between the signals delivered by an electronic housing mounted on one wheel and signals delivered by a speed sensor mounted on the vehicle in the vicinity of this wheel, the solution employed consists in commanding each electronic housing to emit several signals, referred to as synchronized signals, delivered at successive instants for different angular positions of said electronic housing.

Likewise by way of example, in the context of the emission by the electronic housings of the signals containing data indicative of parameters pertaining to the operation of each wheel, the current solution is to emit signals containing several identical data frames.

As a result, these current solutions consist in tolerating the presence of the blackspots and in making use either of a distribution of the synchronized emissions over several angles, or of a repeat of the number of frames transmitted during each emission, in order statistically to guarantee the performance of the radiofrequency transmissions.

SUMMARY OF THE INVENTION

An aspect of the present invention also seeks to guarantee the quality of the radiofrequency transmissions between each of the electronic housings mounted on the wheels of a motor vehicle and a central unit incorporated into this motor vehicle, and its key objective is to provide a method for configuring electronic housings which results in problems associated with the presence of blackspots being overcome when making radiofrequency transmissions.

To this end, an aspect of the invention relates to a method for configuring an electronic housing mounted on a wheel of a motor vehicle for the purposes of transmitting signals intended for a central unit incorporated into said motor vehicle, notable in that it comprises a configuration procedure involving:
- dividing one turn of the wheel into sectors such that said turn of the wheel is divided into a predetermined number n of referenced sectors,
- commanding the emission of a sequence of n successive signals, referred to as configuration signals, which are synchronized with the n referenced sectors and of emission duration $t_{em} \leq T/n$, where T is the period of rotation of the wheel,
- identifying and memorizing the referenced sectors corresponding to the configuration signals received by the central unit,
- and configuring the electronic housing by selecting at least one of the identified referenced sectors for the subsequent emission of the signals intended for the central unit.

The principle behind this configuration method is completely different from that of the present solutions: instead of tolerating the presence of the blackspots and the consequences associated with this presence, the method according to an aspect of the invention is effectively based on the principle of identifying these blackspots and then configuring the electronic housings in such a way that the radiofrequency transmissions are no longer affected by their presence, leading to maximized performance of the procedures that implement these transmissions.

Such a configuration thus makes it possible in particular to select a single fixed emission angle for locating the wheels by synchronization and angular correlation, and to deliver signals containing a single frame of the data indicative of operating parameters, with a view to the transmission of these data. In doing so, this method contributes to limiting the "electronic pollution" and to reducing the electricity consumption of the electronic housings.

Thus, the effectiveness and reliability of the method according to an aspect of the invention can be verified and guaranteed right from the time the vehicle is put into circulation and throughout the life thereof.

According to one preferred exemplary embodiment, the dividing of one turn of the wheel into sectors is performed by dividing said turn of the wheel into a predetermined number n of identical referenced sectors, According to a first advantageous embodiment of an aspect of the invention, the configuration signals consist of a pure carrier wave.

In that case, also and advantageously according to an aspect of the invention, a predetermined number n of referenced sectors is selected and the emission of n configuration signals of an emission duration $t_{em}$ determined as a function of said number n of referenced sectors and of the period T of rotation of the wheel is commanded.

This arrangement leads to the detection of the presence of a blackspot when this zone completely or just partially affects a referenced sector.

In addition, also advantageously according to an aspect of the invention, when the configuration signals consist of a pure carrier wave:
- the emission of a start-of-procedure signal is commanded before the emission of the sequence of n configuration signals, the emission of the first of the n configuration signals is commanded after a predetermined time interval following the emission of the start-of-procedure signal.

These measures make it possible to detect the presence of blackspots and affecting the first and/or last referenced signal emission sector(s).

According to one advantageous alternative form of embodiment of an aspect of the invention, each configuration signal consists in a signal containing data at least notably identifying the referenced emission sector of said configuration signal.

In that case, furthermore, and advantageously according to an aspect of the invention, since the duration of transmission of the data for each configuration signal is fixed, there is determined a number n of sectors that is a function of the duration of said configuration signals and of the period of rotation T, and that is suited to allowing each of said sectors to emit the entirety of each configuration signal.

According to one exemplary embodiment, the method for configuring an electronic housing mounted on a wheel of a motor vehicle for the purposes of transmitting signals intended for a central unit incorporated into said motor vehicle, is implemented on the vehicle production site so as to ascertain the blackspots of a "static" origin resulting from intrinsic characteristics of the vehicle.

According to one exemplary embodiment, the configuration method according to an aspect of the invention is implemented when using the vehicle, after each time the vehicle has been stopped for longer than a predetermined threshold duration, so as to take account of any event that may have modified the position of the blackspots.

According to one exemplary embodiment, the configuration method according to an aspect of the invention is implemented when using the vehicle, periodically, for monitoring purposes.

BRIEF DESCRIPTION OF THE DRAWINGS

Other features, aims and advantages of aspects of the invention will emerge from the following detailed description with reference to the appended drawings showing, by way of non-limiting example, one preferred embodiment thereof. In these drawings.

DETAILED DESCRIPTION OF THE PREFERRED EMBODIMENTS

Figure 1:
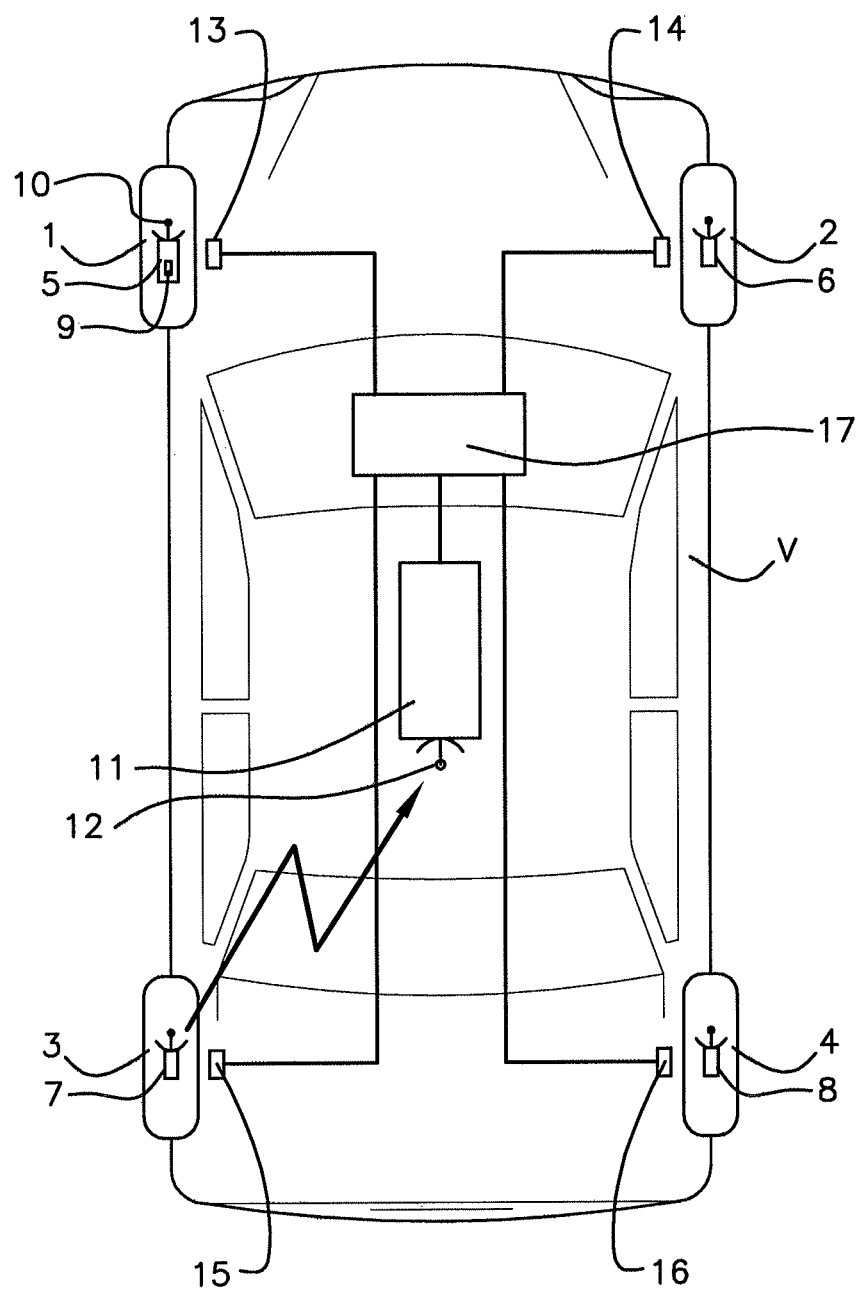
FIG. 1 is a schematic plan view of a vehicle provided with an active monitoring and safety system and allowing implementation of the method according to an aspect of the invention for configuring the electronic housings mounted on the wheels of said vehicle.

The method according to an aspect of the invention described by way of entirely nonlimiting example with reference to the attached figures, is implemented with a view to configuring electronic housings fitted to the wheels of a vehicle V, as depicted in FIG. 1, equipped with four wheels 1-4 and equipped with a system for monitoring parameters, such as the pressure or temperature, of the tires, and with an active safety system such as one of the "ABS" anti-lock braking system or "ESP" dynamic electronic stability system, type.

In the usual way, the monitoring system comprises, as is conventional, firstly, associated with each wheel 1-4, an electronic housing 5-8, for example secured to the rim or to the inflation valve of said wheel so as to be positioned inside the tire casing, or alternatively on the internal face of the tire tread.

Each of these electronic housings 5-8 incorporates sensors dedicated to measuring tire parameters, connected to a microprocessor computation unit connected to an emitter 10.

Each of these electronic housings 5-8 also, in the conventional way, incorporates measurement means 9 for measuring the angular position of said electronic housing. Such measurement means may advantageously consist of an accelerometer capable of supplying modulated signals indicative of the values of gravity, and therefore of the angular position of the electronic housing, and of which the frequency, equal to the frequency of rotation of the wheels, also makes it possible to calculate the rotational speed of said wheels.

The monitoring system also comprises a central unit 11 situated within the vehicle V, including a microprocessor and incorporating a receiver 12 able to receive the signals emitted by the emitters 10 of each of the four electronic housings 5-8.

The vehicle V is also equipped with an active safety system such as an "ABS" anti-lock braking system, or an "ESP" dynamic electronic stability system, comprising four wheel speed sensors 13-16 positioned on the vehicle V, each near to one wheel 1-4, and designed to supply, in the form of values that can be converted into angular values, data indicative of the orientation of said wheel.

In addition, this active safety system comprises an "ABS" or "ESP" computer 17 connected to the various wheel speed sensors 13-16, so as to receive the wheel speed information measured by said sensors and programmed to anticipate the control needed in order to prevent the wheels 1-4 from locking.

In the usual way, the wheel speed sensors 13-16 consist of inductive, magneto-resistive or Hall-effect sensors designed to measure the angular speed of each wheel 1-4, on a toothed or magnetic wheel.

Such equipment notably makes it possible:
first of all, to locate the wheels 1-4 by using a method of synchronization and angular correlation based on the correlation there is between the signals delivered by the speed sensor 9 with which a wheel 1-4 is equipped and synchronized signals delivered by the speed sensor 13-16 mounted on the vehicle V near to this wheel 1-4,
and thereafter to transmit signals containing data indicative of parameters pertaining to the operation of each wheel 1-4 and an identification code identifying the electronic housing 5-8 mounted on said wheel.

The method according to an aspect of the invention is aimed at individually configuring each of the electronic housings 5-8 in such a way that the transmissions of the signals emitted by each of said electronic housings for the attention of the central unit 11 are not disturbed by the presence of the blackspots BS which are zones of non-coverage. Specifically, the blackspots BS, which are the zones of non-coverage, and, therefore, the disturbances they cause in the transmission of the signals emitted by each of said electronic housings vary from one wheel of the vehicle to another.

This configuration method according to an aspect of the invention requires, in order to implement it, prior identification, performed systematically in the usual way by the central unit 11, of the electronic housings 5-8 mounted on the wheels 1-4 of the vehicle V.

The triggering of the procedure for configuring each electronic housing 5-8 is, in the first place, commanded in the conventional way by the central unit 11 via a command signal transmitted by the latter for the attention of said electronic housing. Nevertheless, it should be noted that this triggering may also be commanded by an operator, notably where there is no two-way communication between the electronic housings 5-8 and the central unit 11. The configuration procedure may also be left to the initiative of each electronic housing 5-8 when one of said housings detects an event liable to modify the position of the blackspots.

Figure 2:
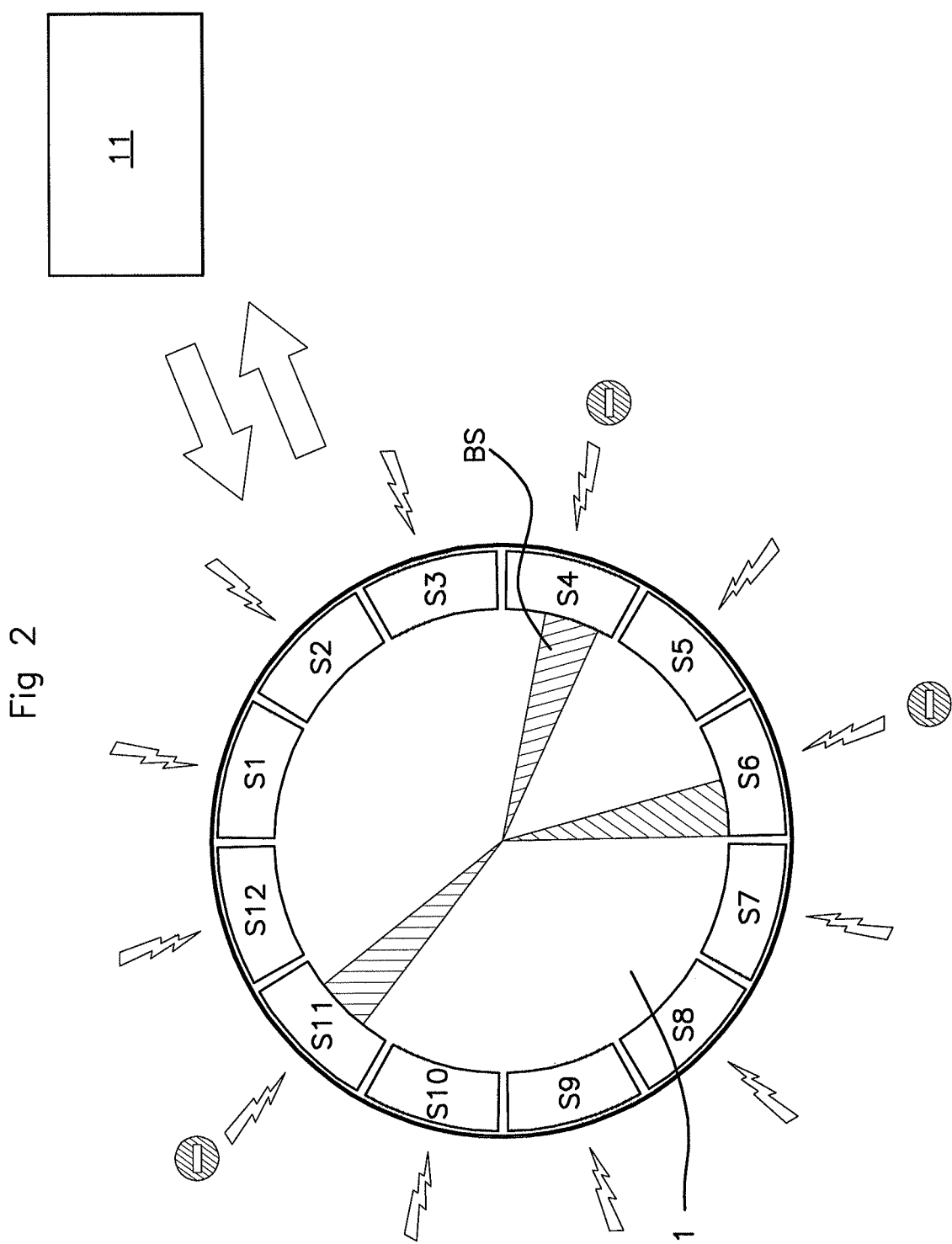
FIG. 2 is a schematic depiction of a wheel and of a central unit, illustrating the configuration method according to an aspect of the invention.

The first actual step of each configuration procedure consists, for each electronic housing 5-8, in dividing the turn of the wheel into sectors, which consists in dividing said turn of the wheel into a predetermined number n of referenced sectors S1-Sn designed to cover the whole of a turn of a wheel, this number n of referenced sectors being, in this example, equal to twelve in the attached FIG. 2, the turn of the wheel thus being divided into twelve sectors S1-S12.

This number n of sectors is determined in an initial phase and either stored in memory within each electronic housing 5-8, or communicated by the central unit 11 to each electronic housing 5-8 when the configuration procedure is triggered.

The determination of this number n of referenced sectors S1-S12 is also dependent on the type of configuration signals subsequently emitted within the context of the configuration method according to an aspect of the invention.

Thus, if the configuration signals consist of pure carrier waves, this number n of referenced sectors S1-S12 is determined in a preliminary phase, and then the emission duration $t_{em}$ of the configuration signals is determined as a function of this number n of referenced sectors S1-S12 and selected such that the emission duration $t_{em}$ of each configuration signal is fixed and such that:

$t_{em} \leq T/n$, where T is the period of rotation of the wheel 1-4.

On the other hand, when the configuration signals consist of signals containing data at least notably identifying the referenced sector S1-S12 of emission of each configuration signal, given that the transmission of this data requires a fixed minimum transmission duration, there is determined a number n of sectors S1-S12 that is a function of this minimum duration of transmission and of the period of rotation T, and that is suited to allowing each of said sectors to emit the entirety of each configuration signal.

The next step in each configuration procedure consists in emitting a sequence of n configuration signals, synchronized with the n referenced sectors S1-S12.

The way in which this emission sequence progresses is also dependent on the type of configuration signals emitted.

Thus, if these configuration signals consist of pure carrier waves, the emission of a start-of-procedure signal is commanded before the emission of the sequence of n configuration signals, and then the emission of the first of the n configuration signals is commanded after a predetermined time interval following the emission of the start-of-procedure signal.

These measures make it possible to detect the presence of blackspots affecting the first and/or last configuration signal emission referenced sector(s).

On the other hand, these preliminary emission steps are not needed when the configuration signals contain identification data identifying the referenced sector S1-S12 of emission of said configuration signals.

The following step in each configuration procedure, which is performed once the sequence of emitting the n configuration signals has been completed, consists in a step whereby the central unit 11 identifies any referenced sectors S1-S12 there might be that correspond to the configuration signals the entirety of which have actually been received by said central unit 11 and which therefore constitute sectors which are free of blackspots (sectors S1-S3, S5, S7-S10, S12 in FIG. 2).

Following this identification, any referenced sectors S1-S12 there might be that correspond to the configuration signals the entirety of which have actually been received by said central unit 11, and which therefore constitute the sectors that are free of blackspots, are then stored in memory.

The following step is for the central unit 11, or possibly an operator, to transmit to the electronic housing 5-8 configuration data for said electronic housing, consisting:

either of data indicative of the identity of the sectors S1-S2 that are free of blackspots, allowing the electronic housing 5-8 to select the position(s) for subsequent emission of the signals intended for said central unit, or, directly, of data indicative of the position(s) for subsequent emission of signals intended for said central unit, In order to determine the position(s) for subsequent emission, one option could furthermore consist in selecting the sector(s) physically farthest from the sectors affected by the presence of blackspots, and therefore not liable to be affected by a blackspot, even when the vehicle V is traveling at high speed.

Such a configuration method, the principle of which is to identify the blackspots and then to configure the electronic housings 5-8 in such a way that the radiofrequency transmissions are no longer affected by the presence of these blackspots leads to maximized performance of the procedures that implement these transmissions.

In addition, this configuration method offers the key advantage that it can be implemented:

initially, on the vehicle V production site, for example using a rolling-road test bed, so as to ascertain the blackspots of a "static" origin resulting from intrinsic characteristics of the vehicle such as the shape of the vehicle, the presence of metallic obstacles, etc., and then, when using the vehicle V, after each time the vehicle has been stopped for longer than a predetermined threshold duration, for example longer than 15 minutes, during which an event that may have modified the position of the blackspots (such as tire changes, changes to the position of the wheels, changes to the load carried on board the vehicle, running at high speed for an extended period, etc.) may have occurred, and/or periodically, for monitoring purposes

The invention claimed is:

1. A method for configuring an electronic housing mounted on a wheel of a motor vehicle for the purposes of transmitting signals intended for a central unit incorporated into said motor vehicle, comprising a configuration procedure involving:

dividing one turn of the wheel into sectors such that said turn of the wheel is divided into a predetermined number n of identical referenced sectors, commanding the emission of a sequence of n successive signals, referred to as configuration signals, which are synchronized with the n referenced sectors and of emission duration $t_{em} \leq T/n$, where T is the period of rotation of the wheel, identifying and memorizing the referenced sectors corresponding to the configuration signals received by the central unit, and configuring the electronic housing by selecting at least one of the identified referenced sectors for the subsequent emission of the signals intended for the central unit.

2. The configuration method as claimed in claim 1, wherein the dividing of one turn of the wheel into sectors is performed by dividing said turn of the wheel into a predetermined number n of identical referenced sectors.

3. The configuration method as claimed in claim 1, wherein the configuration signals consist of a pure carrier wave.

4. The configuration method as claimed in claim 3, wherein a predetermined number n of referenced sectors is selected and the emission of n configuration signals of an emission duration $t_{em}$ determined as a function of the number n of referenced sectors and of the period T of rotation of the wheel is commanded.

5. The configuration method as claimed in claim 3, wherein:

the emission of a start-of-procedure signal is commanded before the emission of the sequence of n configuration signals, and the emission of the first of the n configuration signals is commanded after a predetermined time interval following the emission of the start-of-procedure signal.

6. The configuration method as claimed in claim 1, wherein, each configuration signal comprises a signal containing data at least identifying the referenced emission sector of said configuration signal.

7. The configuration method as claimed in claim 6, wherein there is determined a number n of sectors that is a function of the duration of the configuration signals and of the period of rotation T, and that is suited to allowing each of said sectors to emit the entirety of each configuration signal.

8. The configuration method as claimed in claim 1, wherein the method is implemented on a vehicle production site so as to ascertain the blackspots of a "static" origin resulting from intrinsic characteristics of the vehicle.

9. The configuration method as claimed in claim 1, wherein the method is implemented when using the vehicle, after each time the vehicle has been stopped for longer than a predetermined threshold duration, so as to take account of any event that may have modified the position of the blackspots.

10. The configuration method as claimed in claim 1, wherein the method is implemented when using the vehicle, periodically, for monitoring purposes.

11. The configuration method as claimed in claim 2, wherein the configuration signals consist of a pure carrier wave.

12. The configuration method as claimed in claim 4, wherein:

the emission of a start-of-procedure signal is commanded before the emission of the sequence of n configuration signals, and the emission of the first of the n configuration signals is commanded after a predetermined time interval following the emission of the start-of-procedure signal.

13. The configuration method as claimed in claim 2, wherein, each configuration signal comprises a signal containing data at least identifying the referenced emission sector of said configuration signal.

\* \* \* \* \*